US006024351A

United States Patent [19]

Metoyer

[11] Patent Number: 6,024,351

[45] Date of Patent: Feb. 15, 2000

[54] DOOR AND WINDOW SUPPORT CLAMP

[76] Inventor: Paul Michael Metoyer, 1809 Iroquois Ave., Long Beach, Calif. 90815

[21] Appl. No.: 09/228,818

[22] Filed: Jan. 11, 1999

[51] Int. Cl.$^7$ .......... B23Q 3/02

[52] U.S. Cl. .......... 269/133; 269/905

[58] Field of Search .......... 269/133, 905, 269/910, 43, 149

[56] References Cited

U.S. PATENT DOCUMENTS

| | | | |
|---|---|---|---|
| 611,340 | 9/1898 | Smith . | |
| 689,376 | 12/1901 | Young . | |
| 763,941 | 6/1904 | Butcher . | |
| 848,837 | 4/1907 | Marz et al. | 269/133 |
| 1,715,722 | 6/1929 | Smith et al. . | |
| 2,971,548 | 2/1961 | House | 269/133 |
| 4,168,827 | 9/1979 | Hutchinson . | |
| 4,391,437 | 7/1983 | Collins . | |
| 4,695,067 | 9/1987 | Willey . | |
| 4,799,658 | 1/1989 | Ponce | 269/133 |
| 5,048,806 | 9/1991 | Deutsch et al. . | |

FOREIGN PATENT DOCUMENTS

| | | | |
|---|---|---|---|
| 423041 | 9/1989 | Canada | 269/16 |

*Primary Examiner*—David A. Scherbel
*Assistant Examiner*—Daniel G. Shanley
*Attorney, Agent, or Firm*—Gene Scott-Patent Law & Venture Group

[57] ABSTRACT

A door or window floor clamp provides opposing compression legs pivotally mounted onto opposing base legs and supported in upright attitudes by opposing telescoping braces. The braces are adjustable and extensible with latches provided for positioning the braces on the base legs and for locking the compression legs in place. The clamp folds so that the base legs, the compression legs and the braces are all in parallel adjacency for compact handling and storing.

5 Claims, 3 Drawing Sheets

DOOR AND WINDOW SUPPORT CLAMP

BACKGROUND OF THE INVENTION

1. Field of the Invention

This invention relates generally to workpiece support tools and fixtures, and more particularly to a clamping fixture for enabling the upright support of a door or window so that a carpenter may obtain work access to both sides of the workpiece for installing hardware, cutting mounting apertures, applying finishes, etc.

2. Description of Related Art

The following art defines the present state of this field:

Deutsch et al., U.S. Pat. No. 5,048,806 describes a collapsible frame used as a door hanging aid and provides for two articulating U shaped channel members respectively hinged at proximate ends, one to the other together with one of the arms, which moves into a vertical orthogonal position relative to the other arm, which rests on the floor. The vertical arms support two lateral inclined members which stabilize the unit in a vertical position. The vertical arm also has means to vary the effective width of the vertical channel of that arm so as to accommodate various thicknesses of doors and secure the door therein.

Ponce, U.S. Pat. No. 4,799,658 describes a clamp having movable and fixed ledges extending forwardly toward one another from posts on the clamp's halves. The movable ledge receives a door whose weight moves the ledge in a generally gravitationally downward direction to the post toward the post and to clamp the work piece there between. The fixed ledge is positioned in the path of movement of the door and the movable ledge to limit the movement and any excessive pressure which otherwise might be exerted on the door by the clamp halves. The clamp is mounted on a base which comprises angled piping to form a two-dimensional support for the clamp and the door. Insulated electrical wires extend through the piping. Sockets are secured at one or more ends of the piping, save for one, to provide electrical outlet connections for power tools. The insulated wire extends from the remaining piping end for connection to a conventional electrical outlet.

Willey, U.S. Pat. No. 4,695,067 describes a wheeled carrier for transporting elongated articles having a wheeled axle, a dynamic clamp for the article including spring biasing to return the clamp to a relaxed position when the article is removed therefrom, and a suspension extending between the clamp and the axle to absorb shocks transmitted from the wheels so that the clamping force on the article is substantially constant. A "T" handle will move the carrier when empty by picking up the entire carrier, due to its light weight.

Collins, U.S. Pat. No. 4,391,437 describes a clamp apparatus for holding a door or the like in a generally vertical plane while a workman is preparing the door for hanging within a frame. The apparatus includes a base having a pair of clamping members slidably mounted thereon and such members are connected to a foot operated lever which is operated to move the clamping members apart and a spring or other resilient member urges the clamping members toward each other.

Hutchinson, U.S. Pat. No. 4,168,827 describes a carpenter's door clamp device with two clamping segments hinged together so as to pivot apart for insertion and removal of the door. Fulcrum spacers are mounted on the bottom of one or both clamp segments to enable the clamp to operate by the weight of the door and also to permit quick opening and closing of the clamp by simply applying and removing foot pressure at the outer end of the clamp segment.

Smith et al., U.S. Pat. No. 1,715,722 describes a door supporting vise comprising a pair of hinged strips, a vise jaw fixed on one of the strips adjacent the hinge connection of the strips, a vise jaw mounted on the other strip adjacent the hinge connection of the strips and adjustable toward and away from the first jaw, and a leaf spring pivotally connected to one of the said to swing out laterally thereof, at times, or in line therewith, at times, to extend across the hinge connection and the other strip and normally exerting an upward force on the hinged ends of the strips whereby to hold the vise jaws apart to facilitate the introduction of the edge of a door between said jaws.

Marz et al., U.S. Pat. No. 848,837 describes a carpenter's floor vise comprising a combination of a base provided on its under side with legs, one at each end, whereby the same is supported with a clear space below it and between the legs. There being also spaced longitudinal, slots in the base between its legs, co-acting clamping jaws removably seated on the base whereby these jaws are positioned. The lugs of one jaw being hook-shaped to prevent displacement of this particular jaw, and a set-screw carried by the other jaw and occupying the slot below it whereby this jaw is adjustably held. The base upon which these jaws are mounted consists of an elongated piece of steel so that the weight of an object may act upon this base in a manner to actuate the jaws automatically for the purpose of gripping or releasing such object.

Butcher, U.S. Pat. No. 763,941 describes a floor vise composed of two frame members pivotally connected at their inner extremities and spring-supported whereby the pivoted parts of the members are normally supported above the outer extremities of the members and a jaw pivotally mounted upon each member and each jaw having an inclined slot and the member having a pin passing through the slot, each jaw being hollow, and a spring being coiled around the pin upon which each member is supported, and having its extremities engaging the jaw on the inside whereby the latter is supported in the uppermost position permitted by its slow.

Young, U.S. Pat. No. 689,376 describes a floor vise comprising two twin members hinged together at their inner or adjacent extremities, and a leaf-spring attached to one member and passing over the hinge to engagement with the opposite member, whereby the central part of the two members is normally spring-supported above the surface upon which their outer extremities or feet rest., a space being left between their inner extremities above the hinge, and cooperating clamping-blocks pivotally mounted on their inner extremities which are recessed to allow the blocks to swing and adjust themselves to the surface of the article to be held.

Smith, U.S. Pat. No. 611,340 describes a clamping device for supporting doors and comprising two base portions, and adjustable and removable clamping frame mounted upon each of the base portions and a connecting ling pivotally connecting the base portions for the purpose set forth.

The prior art teaches several clamping devices suitable for supporting a door or window in an upright attitude. However, the prior art does not teach that such a clamping support may be lightweight, portable and constructed with hinged leg construction so as to be highly compact when folded and yet provide significant clamping action when applied to a workpiece. The present invention fulfills these needs and provides further related advantages as described in the following summary.

SUMMARY OF THE INVENTION

The present invention teaches certain benefits in construction and use which give rise to the objectives described below.

The present invention provides a door or window floor clamp having opposing compression legs pivotally mounted onto opposing base legs and supported in upright attitudes by opposing telescoping braces. The braces are adjustable and extensible with latches provided for positioning the braces on the base legs and for locking the compression legs in place. The clamp folds so that the base legs, the compression legs and the braces are all in parallel adjacency for compact storage and lightweight portability.

A primary objective of the present invention is to provide a floor clamp for supporting a workpiece in an upright position having advantages not taught by the prior art.

Another objective is to provide such a clamp having highly compact storage foldability.

A further objective is to provide such a clamp having opposing base legs supporting opposing compression legs held upright by positionable telescoping brace legs.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
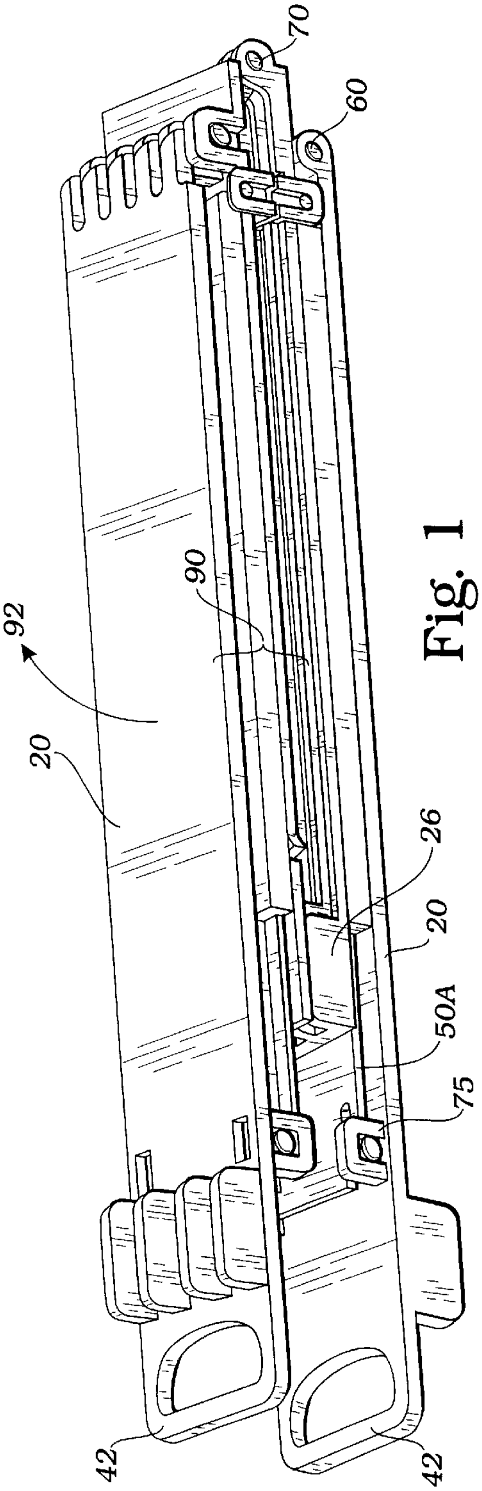
FIG. 1 is a perspective view of the preferred embodiment of the present invention shown in a fully folded state for porting and for storing compactly.
Figure 2:
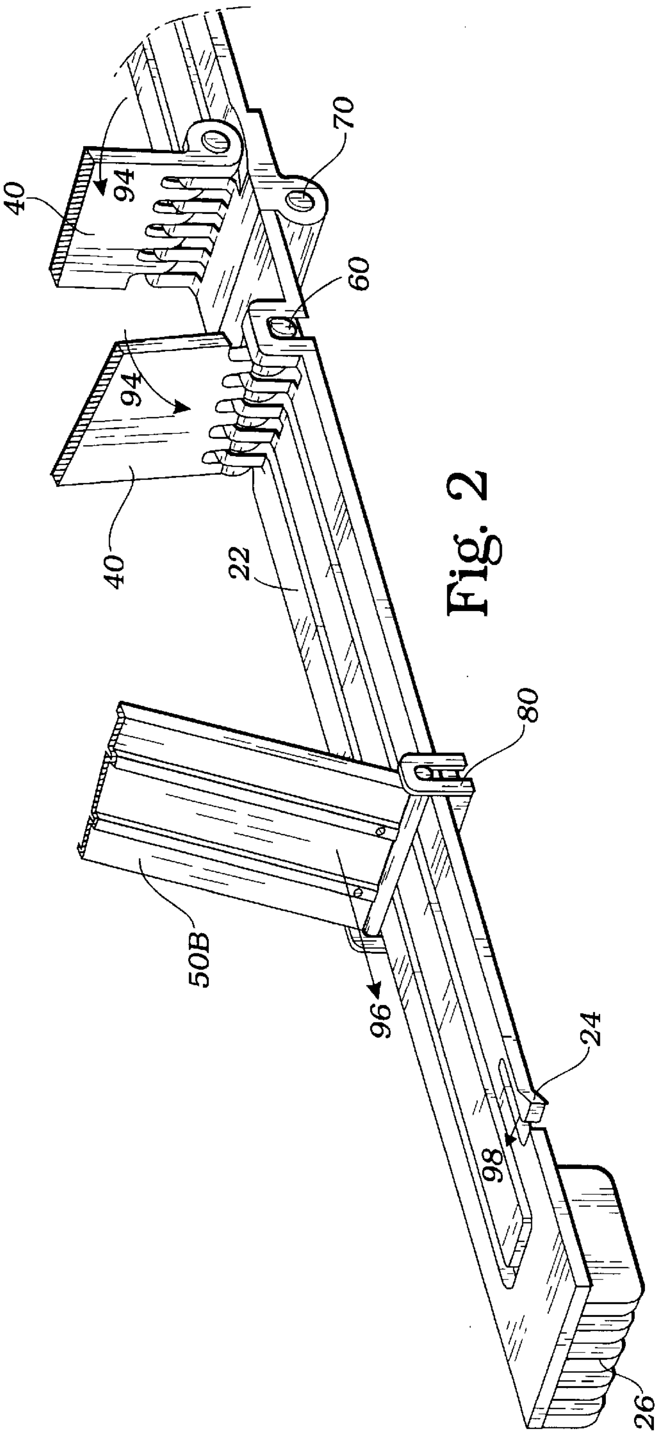
FIG. 2 is a partial perspective view of the invention showing the adjustments possible for the compression leg, the first latching means and the telescoping brace with respect to the base leg thereof.
Figure 3:
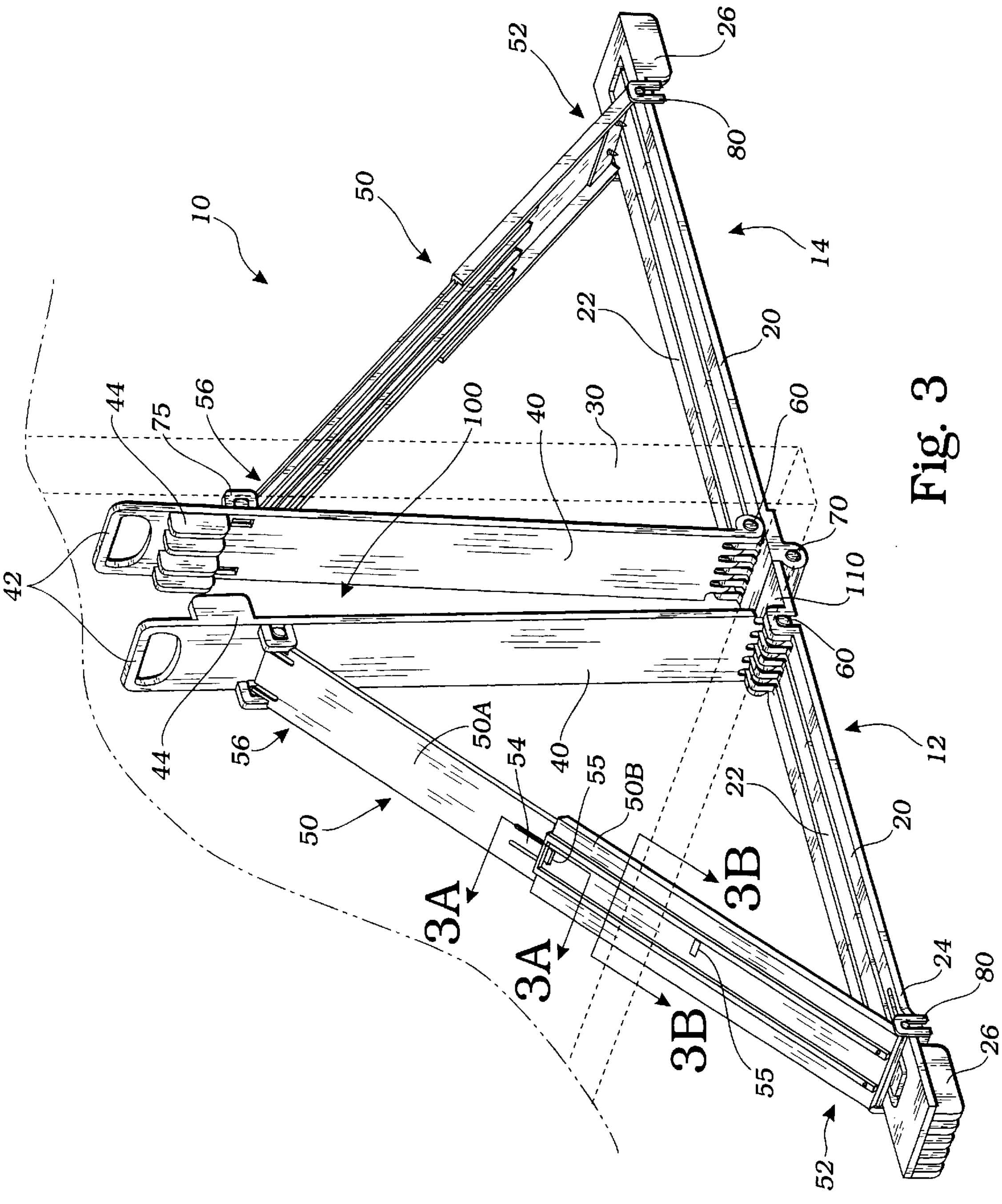
FIG. 3 is a perspective view thereof showing the invention as fully deployed for supporting and clamping a workpiece.
Figure 3A:
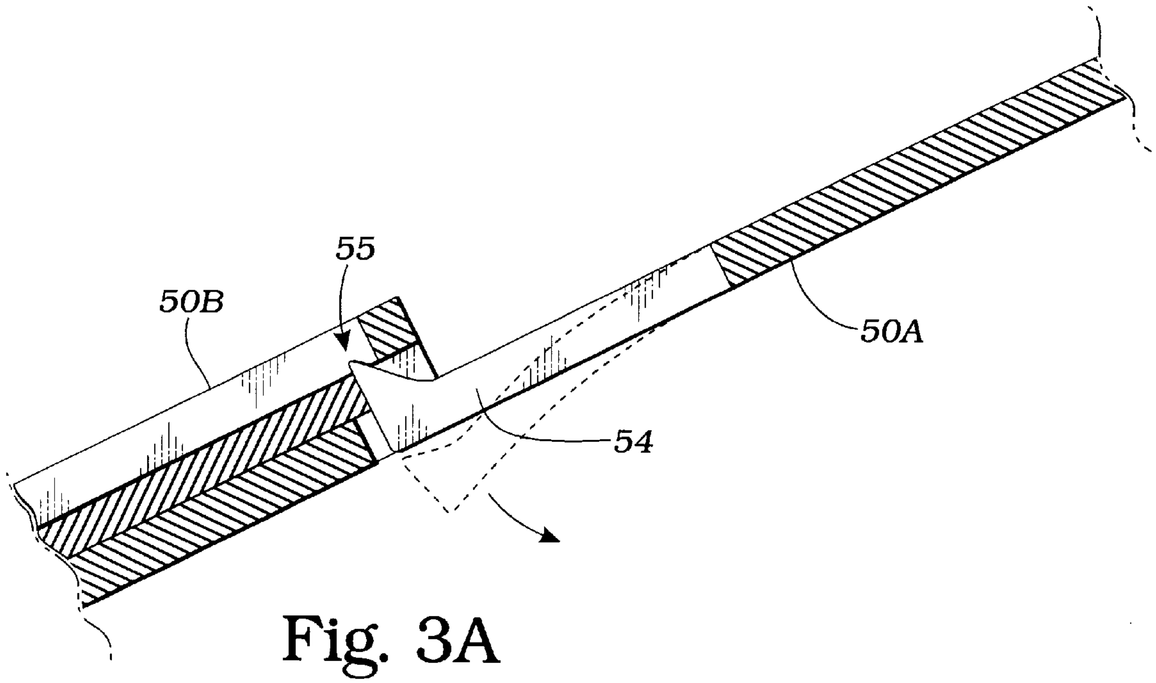
FIG. 3A is a sectional view thereof taken along cutting plane line 3A—3A in FIG. 3 showing the second latching means of the invention and its motion of actuation.
Figure 3B:
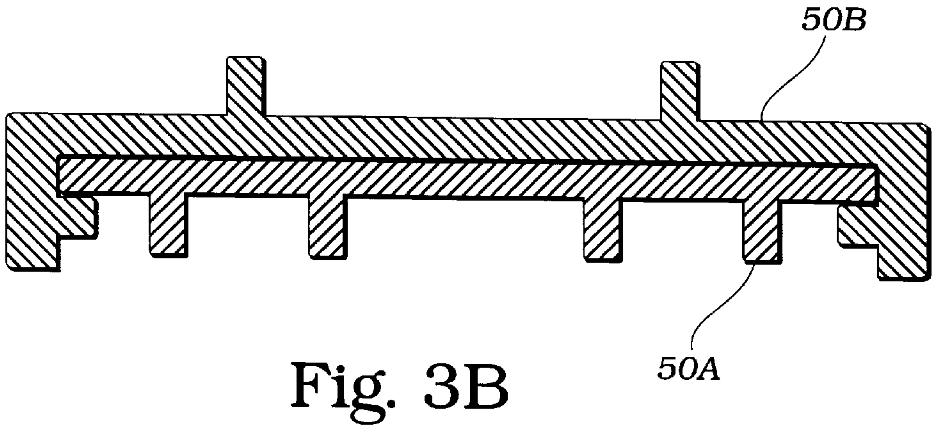
FIG. 3B is a sectional view thereof taken along cutting plane line 3B—3B in FIG. 3 showing the preferred construction of the telescoping brace of the invention.

The above described drawing figures illustrate the invention 10, a workpiece clamping apparatus, as shown in FIG. 3, and which is preferably made of a tough and slightly flexible reinforced plastic resin by a molding, machining or extruding process, comprising two complementary opposing clamp portions 12 and 14 which are identical parts, each of the clamp portions comprising; a base leg 20 for resting on a surface such as a table or floor, in support of the apparatus 10 and a workpiece 30, as can be seen in FIG. 3, the workpiece being clamped in an upright attitude for convenient access by a craftsman; a compression leg 40 enabled by a hinge arrangement to be described, for rotational elevation from the base leg 20 for applying pressure against the workpiece 30, at fingers 44 for clamping thereof; a telescoping brace 50, comprising an upper portion 50A and a lower portion 50B, adjustably commuting between the base leg 20 at one end 52 thereof and the compression leg 40, at the other end 56, for setting an angular relationship therebetween of preferably, about 90°; a first hinge means 60 preferably of any robust type such as is shown in FIG. 3, rotationally joining the compression leg 40 to the base leg 20 for enabling the compression leg 40 to be positioned against the workpiece 30 and alternately, for enabling the compression leg 40 to be positioned in side-by-side adjacency with the telescoping brace 50 as is clearly shown in FIG. 1 where the apparatus 10 is fully folded; a second hinge means 70 rotationally joining the base legs 20 of the two clamp portions 12 and 14 so as to enable the base legs 20 to be positioned colinearly as shown in FIG. 3 and alternately, positioned in side-by-side adjacency for compactly carrying and storing the apparatus as shown in FIG. 1. Inventively, both of the clamp portions 12 and 14 provides a sliding joint means 80 pivotally engaging the telescoping brace 50 at its lower terminal end (one end 52) and slidingly engaging the base leg 20 (see the motion arrow 96) thereby enabling the one end 52 of the telescoping brace 50 to move along a commuting surface 22 of the base leg 20. A third hinge means 75 provides pivotal attachment of the other end 56 of the telescoping brace 50 to the compression leg 40. Inventively, each of the base legs 20 provides a first latching means 24 such as a simple press tong as best seen in FIG. 2, for locking the sliding joint means 80 and thereby, the telescoping brace 50 in a preferred position on the base leg 20, most preferably at, or near the free end of the base leg 20 as shown in FIG. 3. Inventively, each of the telescoping braces 50 provides a second latching means 54, again, a press tong or other simple type, for locking the telescoping brace 50 at a preferred extension for rigidly securing the compression leg 40 against the workpiece 30. Such locked positions of the telescoping brace 50 may be selected from a plurality of such positions by selecting an appropriate slot 55 for locking such a press tong as shown in FIG. 3A. Inventively, at least one, and preferably both of the compression legs 40 provides a handle 42 at a distal end thereof so as to provide for convenient carrying of the apparatus.

In use the apparatus 10 is stored and carried to the worksite in the folded state as shown in FIG. 1 where the two compression legs are positioned in parallel and the handles 42 are adjacent and, together, convenient for grasping with a hand so as to easily carry the apparatus 10. In unfolding the apparatus 10 for use, the apparatus is first placed on the floor or other support surface in the attitude shown in FIG. 1 where the lower compression leg 20 is on the support surface. Next, the upper compression leg, telescoping brace 50 and support leg 20, shown as reference 90 are grasped and rotated about the second hinge means 70 in the direction of arrow 92 until the top compression leg 20 is in contact with the support surface and the two support legs 20 are facing upwardly. Next, the apparatus is inverted so that the support legs 20 are in contact with the support surface. Next, as shown in Fig., the two compression legs 40 are raised by rotation about each of the respective first hinge means 60 in the direction of arrow 94 for the left compression leg 40. In order for the compression legs to achieve a 90° rotation, the telescoping braces 50 will extend to a small extent, being pulled by the compression legs. When the compression legs are in a near vertical position, as shown in FIG. 3, the sliding joint means 80 is pulled in the direction of arrow 96 until it has been moved past the first latching means 24, the latching means 24 moving as shown by arrow 98 to accommodate passage of the first latching means 24 so that it is captured between the support leg foot 26 and the first latching means 24. The compression leg is then raised toward the vertical until the second latching means 54 locks into place in the manner shown in FIG. 3A. When these steps are completed for both of the two complementary opposing clamp portions 12 and 14 a space 100 is produced therebetween for accommodating the workpiece 30. It should be noticed that the workpiece 30 is clamped between the two opposing compression legs, which in turn are pressed against the workpiece 30 by the telescoping braces 50. The weight of the workpiece is supported by the two base legs at point 110, shown in FIG. 3.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A clamping apparatus comprising two complementary opposing clamp portions, each of the clamp portions comprising:

- a base leg for resting on a surface in support of the apparatus and a workpiece;
- a compression leg enabled for rotational elevation from the base leg for applying pressure against the workpiece for clamping thereof;
- a telescoping brace adjustably commuting between the base leg and the compression leg for setting an angular relationship therebetween;
- a first hinge means rotationally joining the compression leg to the base leg for enabling the compression leg to be positioned against the workpiece and alternately, for enabling the compression leg to be positioned in side-by-side adjacency with the telescoping brace;
- a second hinge means rotationally joining the base legs of the two clamp portions so as to enable the base legs to be positioned colinearly and alternately positioned in side-by-side adjacency for compactly porting and storing the apparatus.

2. The apparatus of claim 1 wherein for each of the clamp portions a sliding joint means engages the telescoping brace and the base leg thereby enabling one end of the telescoping brace to move along a commuting surface of the base leg.

3. The apparatus of claim 2 wherein for each of the clamp portions the base leg provides a first latching means for locking the telescoping brace in a preferred position on the base leg.

4. The apparatus of claim 3 wherein for each of the clamp portions the telescoping brace provides a second latching means for locking the telescoping brace at a preferred extension for securing the compression leg against the workpiece.

5. The apparatus of claim 1 wherein at least one of the compression legs provides a handle at a distal end thereof.

* * * * *